United States Patent
Awada et al.

(10) Patent No.: US 7,496,853 B2
(45) Date of Patent: Feb. 24, 2009

(54) METHOD OF MANAGING ITEMS ON A CLIPBOARD

(75) Inventors: Faisal M. Awada, Round Rock, TX (US); Joe Nathan Brown, Austin, TX (US); Philip Bernard Burkes, Round Rock, TX (US); Herman Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1023 days.

(21) Appl. No.: 10/434,525

(22) Filed: May 8, 2003

(65) Prior Publication Data

US 2004/0226012 A1 Nov. 11, 2004

(51) Int. Cl.
  *G06F 17/00* (2006.01)
  *G06F 9/00* (2006.01)
  *G06F 3/00* (2006.01)
  *G11B 27/00* (2006.01)
  *H04N 5/44* (2006.01)
  *H04N 7/173* (2006.01)

(52) U.S. Cl. .................. 715/767; 715/764; 715/769; 715/770; 715/716

(58) Field of Classification Search ............ 715/500.1, 715/716, 769, 770, 767, 766, 765, 764, 724, 715/723
  See application file for complete search history.

(56) References Cited

U.S. PATENT DOCUMENTS

| | | | |
|---|---|---|---|
| 5,752,254 A * | 5/1998 | Sakairi | 715/530 |
| 5,801,693 A * | 9/1998 | Bailey | 715/769 |
| 5,924,099 A * | 7/1999 | Guzak et al. | 707/100 |
| 6,269,389 B1 * | 7/2001 | Ashe | 718/100 |
| 6,983,328 B2 * | 1/2006 | Beged-Dov et al. | 709/230 |
| 6,986,105 B2 * | 1/2006 | Walker, Jr. | 715/531 |
| 2003/0076364 A1 * | 4/2003 | Martinez et al. | 345/810 |
| 2004/0100496 A1 * | 5/2004 | Creasor et al. | 345/748 |
| 2004/0150671 A1 * | 8/2004 | Kamiwada et al. | 345/782 |
| 2004/0207660 A1 * | 10/2004 | Marion et al. | 345/764 |
| 2004/0210846 A1 * | 10/2004 | Olsen | 715/761 |

OTHER PUBLICATIONS

"Clipboard Express" http://web.archive.org/web/20020823011407/www.cheqsoft.com/clipboard.html, pp. 1-3.*

* cited by examiner

*Primary Examiner*—Dennis-Doon Chow
*Assistant Examiner*—Sabrina L. Greene
(74) *Attorney, Agent, or Firm*—Volel Emile; Diana L. Gerhardt; Mark E. McBurney

(57) ABSTRACT

A method of enabling a user to manage items such as text, graphics image, audio clips, video clips etc. on a clipboard are provided. The method includes displaying a window having at least one option for managing the items on the clipboard and allowing the user to assert the option to manage the items. In another embodiment, a method is provided to indicate a selected item at a location in a document displayed in a graphical user interface with a scrollbar. The method includes selecting the item, determining whether the item is a file, and displaying, if the item is a file, an icon representing the file in the scrollbar at a location corresponding to the location of the highlighted item.

6 Claims, 8 Drawing Sheets

DEPRESS "ctrl" KEY AND LEFT CLICK ON ITEMS IN
THE ORDER THEY ARE TO BE ARRANGED.
WHEN DONE CLICK ON BUTTON BELOW

DONE — 605

FIG. 6

DEPRESS "ctrl" KEY AND LEFT CLICK ON ITEMS I N
THE ORDER THEY ARE TO BE PASTED. WHEN
DONE CLICK ON BUTTON BELOW

DONE — 705

FIG. 7

METHOD OF MANAGING ITEMS ON A CLIPBOARD

BACKGROUND OF THE INVENTION

1. Technical Field

The present invention is directed to word processing application programs. More specifically, the present invention is directed to method of Managing items on a clipboard.

2. Description of Related Art

Most word processing application programs allow a user to remove or copy a block of text, an audio or video clip, graphics etc. from a document and to transfer them to another location in the document or to another document altogether. To remove an item (i.e., a block of text, an audio or video clip, or graphics etc.) from the document is generally referred to as "cut" whereas to copy the item is referred to as "copy". To transfer the cut or copied item to another location of the document or to another document is referred to as "paste".

When an item is cut or copied from a document, it is ordinarily transferred to a temporary buffer called a clipboard. This allows the user to later paste the item at the other location in the document or in the other document. Note that copying and cutting an item from a document will henceforth be referred to as copying the item onto the clipboard or plainly "to copy".

Presently, a plurality of items may be copied onto the clipboard. However, once there the items may not be manipulated (e.g., they may not be consolidated into one item).

Consequently, there is a need for a method of managing items on a clipboard.

SUMMARY OF THE INVENTION

The present invention provides a method of enabling a user to manage items such as text, graphics image, audio clips, video clips etc. on a clipboard. The method includes displaying a window having at least one option for managing the items on the clipboard and allowing the user to assert the option to manage the items.

In another embodiment, the present invention provides a method to indicate a selected item at a location in a document displayed in a graphical user interface with a scrollbar. The method includes selecting the item, determining whether the item is an object of a particular type and displaying an icon representing the object at a location in the scrollbar corresponding to the location of the highlighted item.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 depicts a pop-up window used to re-order items on a clipboard.

FIG. 7 is a pop-up window used to paste items on a clipboard in a document.

DETAILED DESCRIPTION OF THE PREFERRED EMBODIMENT

Figure 1:
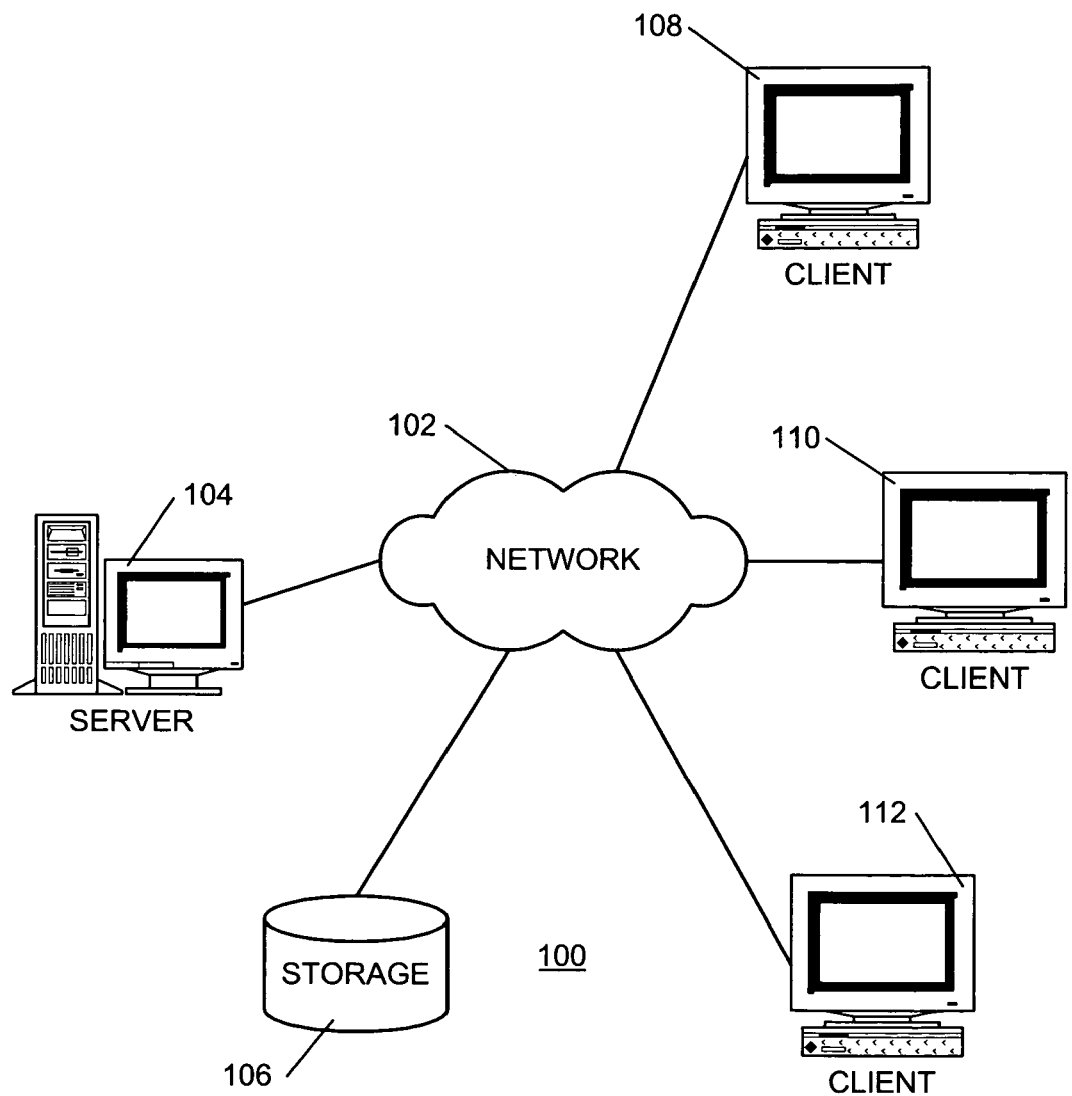
FIG. 1 is an exemplary block diagram illustrating a distributed data processing system according to the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
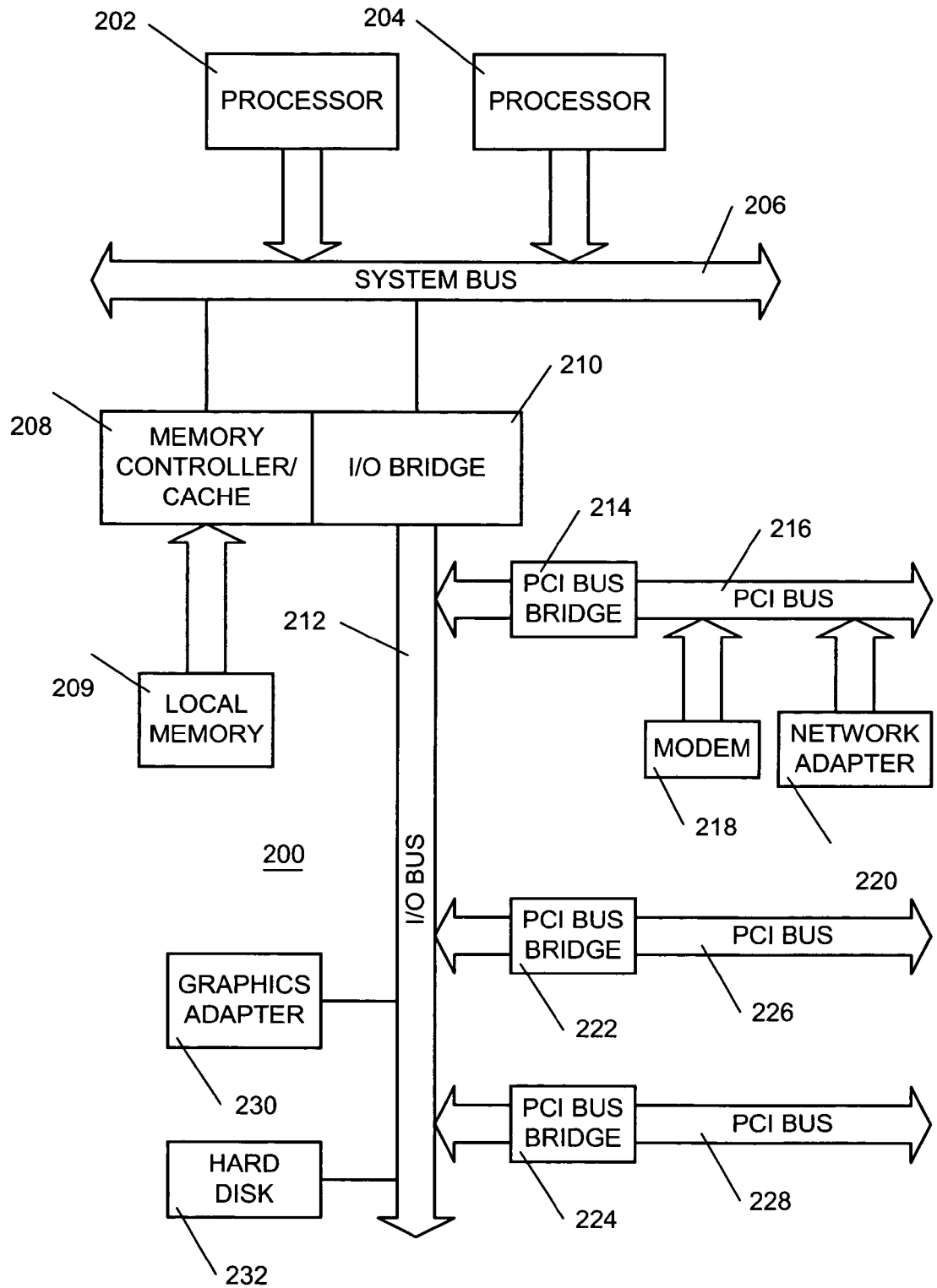
FIG. 2 is an exemplary block diagram of a server apparatus according to the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pseries system, a product of International Business Machines Corporation in Armonk, N.Y., running the Advanced Interactive Executive (AIX) operating system or LINUX operating system.

Figure 3:
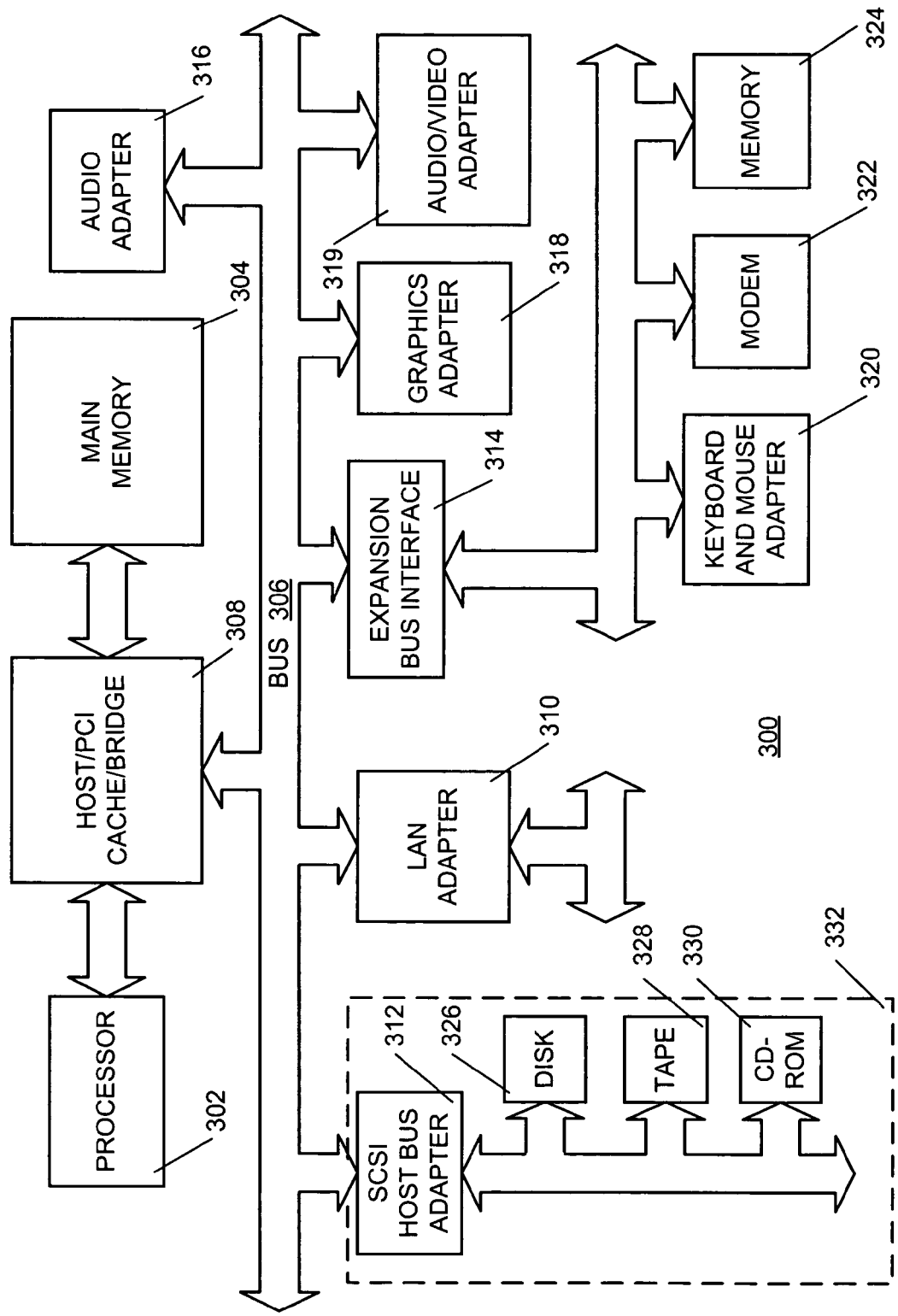
FIG. 3 is an exemplary block diagram of a client apparatus according to the present invention.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer in addition to taking the form of a PDA. Data processing system 300 also may be a kiosk or a Web appliance.

The present invention provides an apparatus, system and method of manipulating items on a clipboard. The invention may be local to client systems 108, 110 and 112 of FIG. 1 or to the server 104 or to both the server 104 and clients 108, 110 and 112 and may reside on any data storage medium (i.e., floppy disk, compact disk, hard disk, ROM, RAM, etc.) used by a computer system.

Presently, when a viewer is using a word processing application program to view a document and the user desires to copy an item from the document, the user has to first select or highlight the item. In certain word processing systems, such as Microsoft® Word 2002, a user may select additional items by holding down the control (ctrl) key while selecting or highlighting the items. After selecting or highlighting all the desired items, the user may click on the "copy" icon or the "cut" icon in the tool bar of the word processing application program to copy them onto the clipboard. The present invention uses the same principle to select multiple items to be copied.

Figure 4:
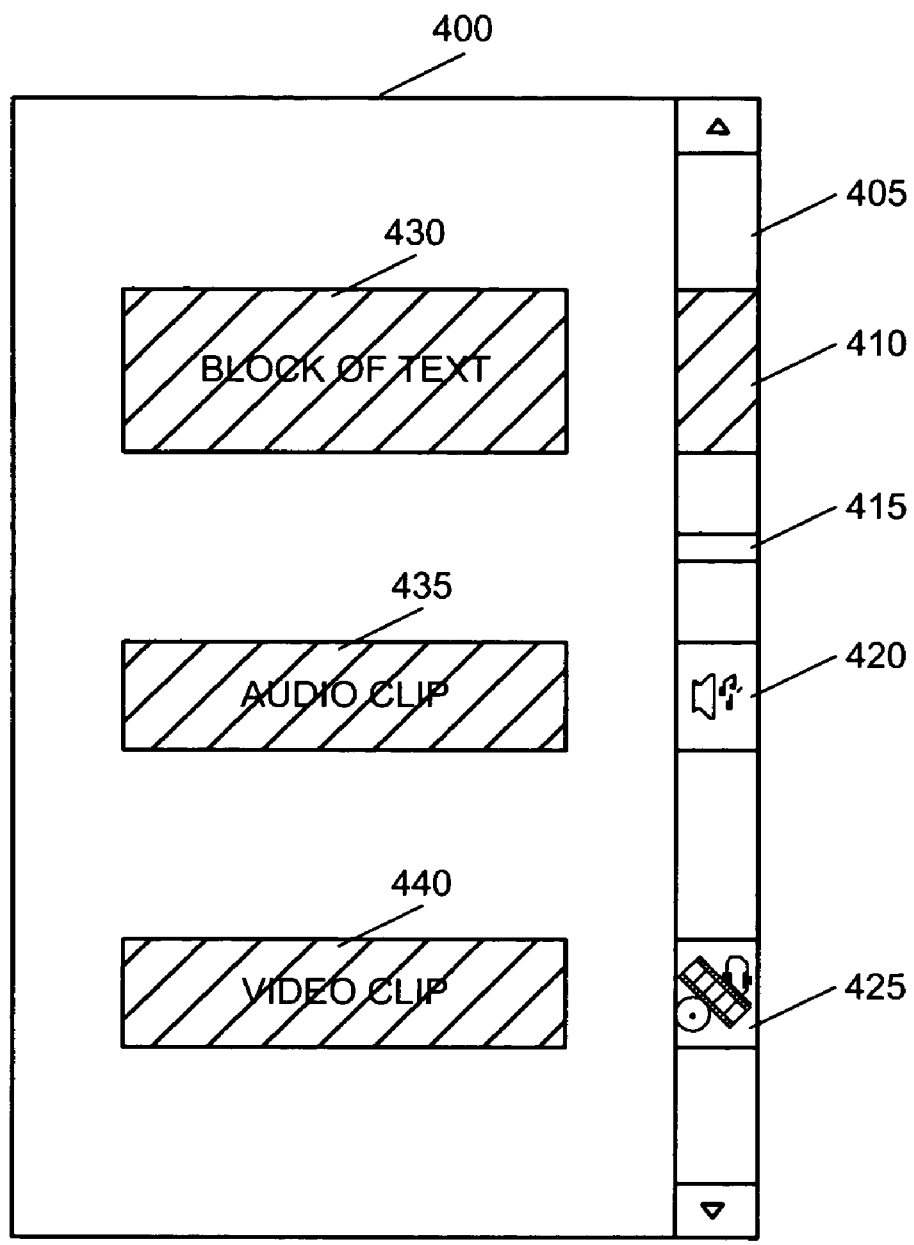
FIG. 4 depicts a computer screen displaying a document with different items highlighted in accordance with the invention.

FIG. 4 depicts a computer screen 400 displaying a document with different selected items. The screen 400 includes a scroll bar 405. The scroll bar 405 has a scroll bar slider 415 and sections 410, 420 and 425. Sections 420 and 425 indicate via icons the selected items. For example, if the highlighted item is an audio clip (see audio clip 435), the section may have a speaker icon as shown in section 420. Likewise, if the highlighted item is a video clip (see video clip 440), the section may have a video or multimedia icon as shown in section 425. Highlighted blocks of text (e.g., block of text 430) may be indicated as shown by section 410.

After the user selects all the desired items, the user may, as customary, asserts the "cut" or "copy" icon to copy the selected items onto the clipboard. Further, in cases where the user, after selecting a plurality of items, decides instead to copy only one of the selected items, the user need not unselect the unwanted items. Rather, the user may right click on the icon next to the desired item and copy the item onto the clipboard.

Figure 5:
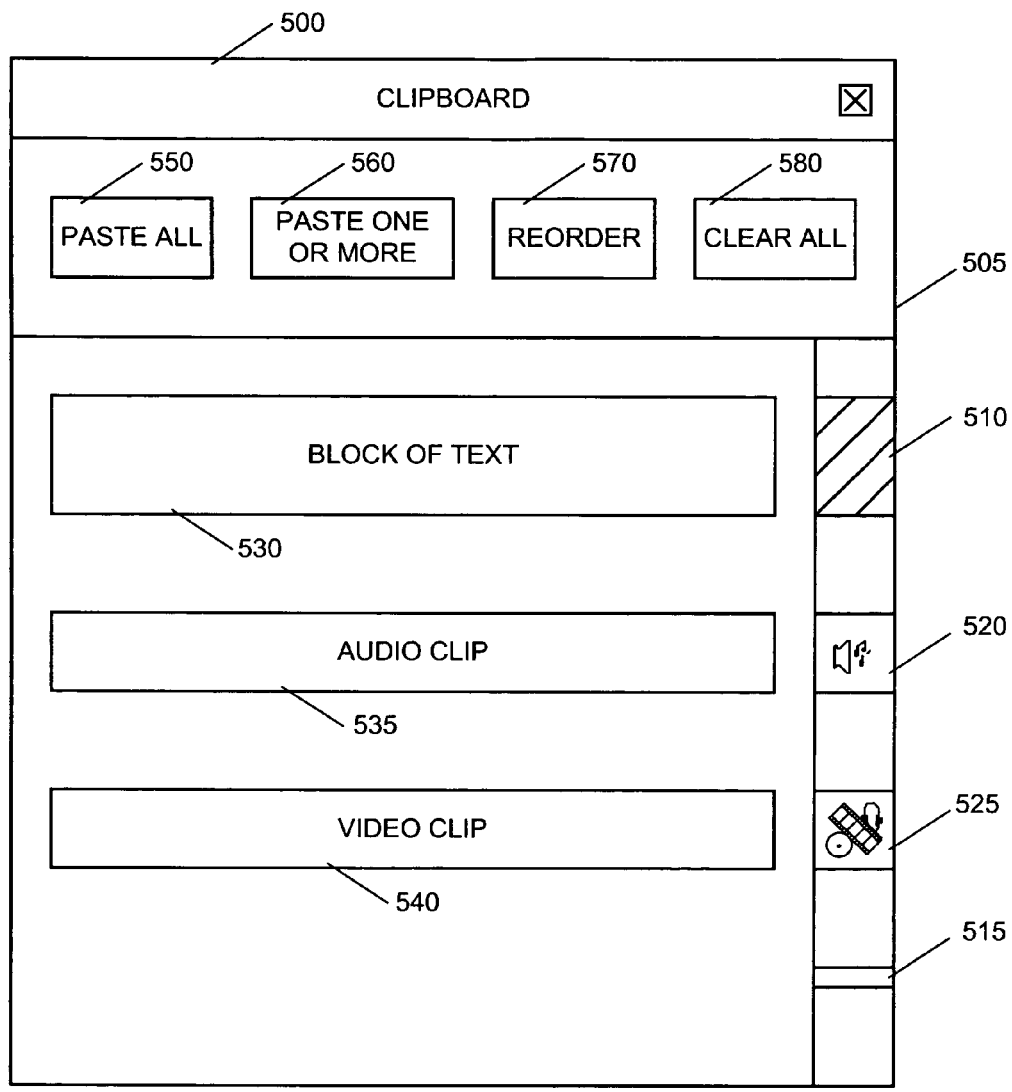
FIG. 5 depicts a clipboard having a plurality of items posted thereon.

FIG. 5 depicts a clipboard on which a plurality of copied items is posted. The clipboard has a scrollbar 505 that includes sections 510, 520 and 525. These sections perform the same functions as sections 410, 420 and 425 in FIG. 4. That is, if the section corresponds to a copied block of text (e.g., block of text 530), then the section is highlighted as shown by section 510. If, on the other hand, the section corresponds to a copied audio clip (e.g., audio clip 535), then the section contains an audio icon as shown by section 520. If the section corresponds to a copied video clip instead, then the section contains a video icon as illustrated by section 525.

The clipboard 500 also contains buttons 550, 560, 570, 580 and 590. Button 550 is used to paste all items on the clipboard into a document. Generally, the items will be pasted in the order in which they were posted. However, a user may reorder or rearrange the items by asserting "reorder" button 570. When the button 570 is asserted, FIG. 6 will pop-open. FIG. 6 instructs the user to left-click on the items to be reordered in the order they are to be reordered. After doing so, the user may assert "done" button 605 to reorder the items. Alternatively, the user may manually select and reorder each item individually.

"Paste one or more" button 560 allows a user to select one or more items from the clipboard to paste in a document. Particularly, when button 560 is asserted, FIG. 7 will pop-open. FIG. 7 instructs the user to select items in the order the user desires them to be pasted. When the user has finished selecting the items, the user may assert on "done" button 705 to have the items pasted in the document.

As the name suggests "clear all" button 580 may be used to delete all items that are on the clipboard. Note that although a video and an audio icon are used to explain the invention, the invention is not thus restricted. For example, a document icon may be used to indicate that a whole document is selected or is on the clipboard. Likewise, a graphics icon may be used to indicate that a graphics image is selected or is on the clipboard etc. Thus, the video and audio icons are used for illustrative purposes only.

Figure 8:
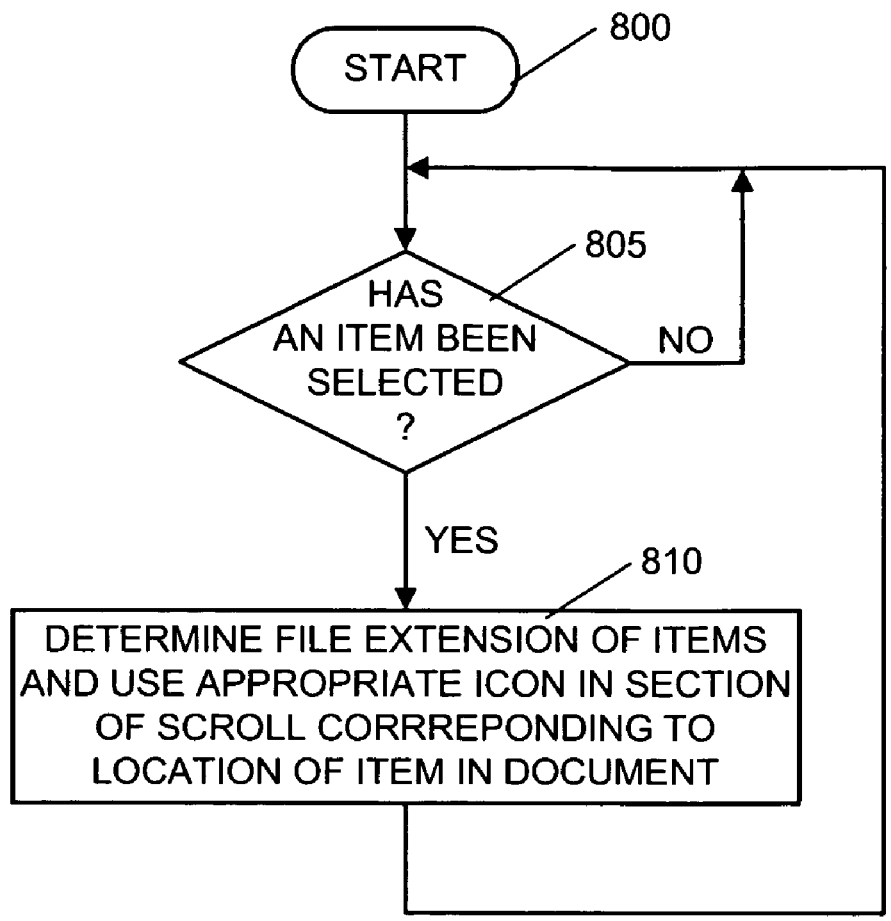
FIG. 8 is a flow diagram of a process used by the present invention.

FIG. 8 is a flow chart of a process that may be used to implement the invention. The process starts as soon as a user selects an item to copy. When this occurs, a check will be made to determine the object type of the selected item. The object type may be an element of the subject document or it may be a reference to a file. If the object type is not a referenced file but a component of the document, there will not be a file extension, as in the case where a block of text is selected from a document, then the section of the scrollbar that corresponds to the location of the selected block of text in the document will be highlighted. If the object type is a reference to a file, and the file type indicates that the file is an audio file (i.e., .WAV), then a speaker icon may be inserted in the section in the scrollbar corresponding to the location of the audio clip in the document. Likewise, a multimedia icon or a graphics icon etc. may be inserted in the section of the scrollbar corresponding to a multimedia object or a graphics object etc., respectively and the process returns to step 805 (steps 800, 805 and 810).

Figure 9:
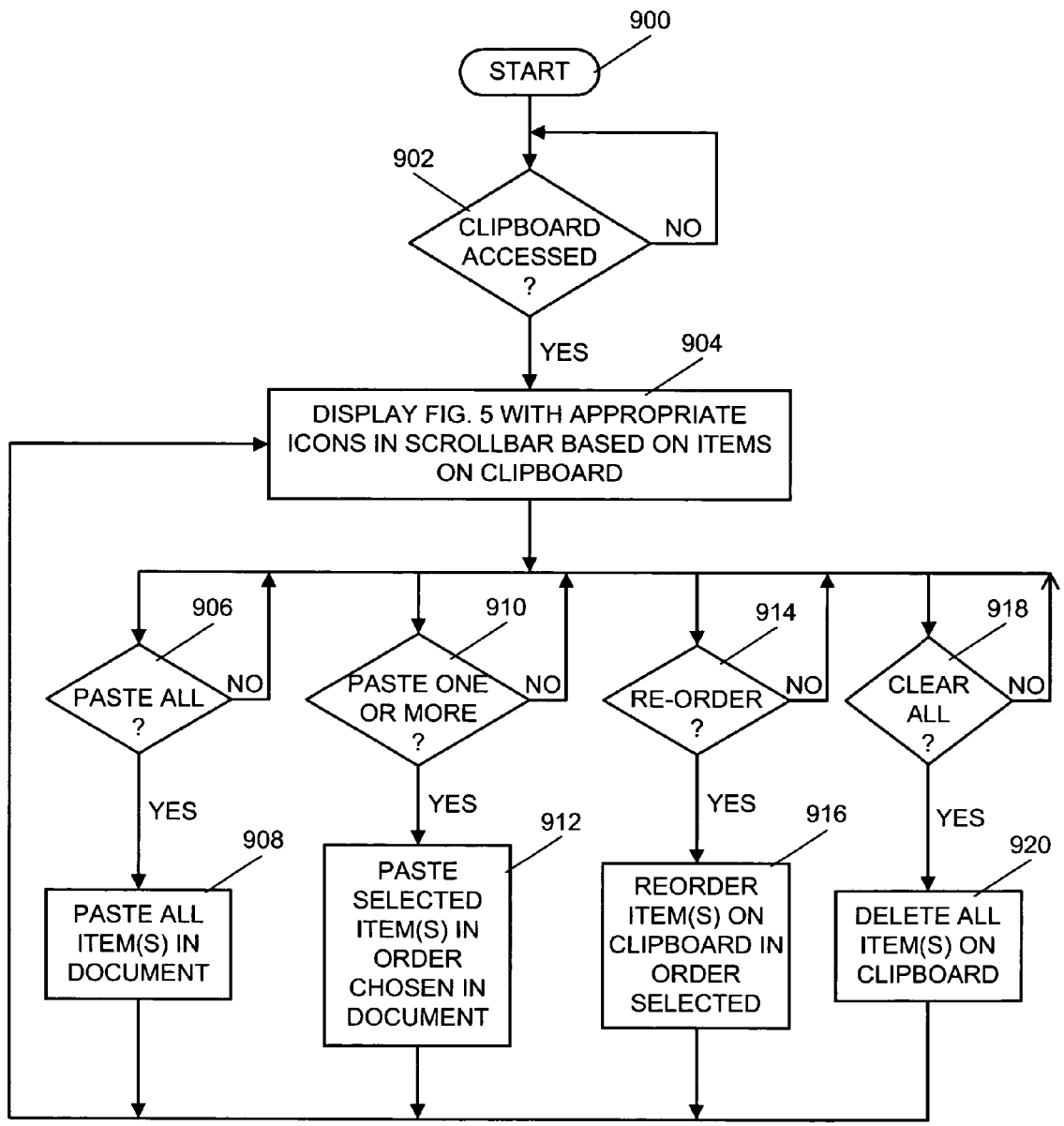
FIG. 9 is a flow diagram of another process used by the present invention.

FIG. 9 is a flow chart of a process that may be used to implement the invention. The process starts when a word processor is accessed (step 900). Then a check is continually being made to determine whether the clipboard is to be displayed. If so, FIG. 5 is displayed. In FIG. 5, as mentioned before, options are given to the user to either paste all or one or a few of the items on the clipboard in the document. If the user selects to paste all, then all the items will be pasted in the document. If the user chooses to paste one or a few of the items, then the chosen items will be pasted. In the case where more than one item is chosen, the items will be pasted in the order they were selected and the process will return to step 904 (steps 900, 902, 904, 906, 908, 910 and 912).

From FIG. 5, the user may reorder the items on the clipboard or altogether delete them from the clipboard. If the user decides to reorder the items, they will be reordered in the order the user selected them (steps 900. 902, 904, 914, 916, 918 and 920).

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of indicating a highlighted item in a document, the document being displayed in a graphical user interface having a scrollbar, the method comprising the steps of:
    selecting the item;
    determining whether the selected item is a file; and
    displaying, if the item is a file, an icon representing the file in the scrollbar at a location corresponding to the location of the selected item in the document.

2. The method of claim 1 wherein if the item is not a file the location in the scrollbar corresponding to the location of the selected item is highlighted.

3. The method of claim 2 wherein if the item is copied onto a clipboard, the clipboard having a scrollbar, the item and the icon are displayed on the clipboard, the icon being displayed in the scrollbar of the clipboard at a location corresponding to the location of the item on the clipboard.

4. The method of claim 3 wherein if the file is a multimedia file a multimedia icon is displayed.

5. The method of claim 4 wherein if the file is a graphics file a graphics icon is displayed.

6. The method of claim 5 wherein if the file is an audio file an audio icon is displayed.

* * * * *